United States Patent [19]

Lutz

[11] 4,009,476
[45] Feb. 22, 1977

[54] APPARATUS FOR AUTOMATICALLY CONTROLLING DOOR OPERATION

[75] Inventor: Erno B. Lutz, Sunnyvale, Calif.
[73] Assignee: Solfan Security Systems, Palo Alto, Calif.
[22] Filed: June 27, 1975
[21] Appl. No.: 590,811
[52] U.S. Cl. .............................. 343/7 ED; 49/25; 49/31; 343/5 PD
[51] Int. Cl.² ...................... G01S 9/02; E05F 15/20
[58] Field of Search ........... 343/5 PD, 7 ED; 49/25, 49/31

[56] References Cited

UNITED STATES PATENTS

| | | | |
|---|---|---|---|
| 3,181,856 | 5/1965 | Dyben | 49/25 |
| 3,665,443 | 5/1972 | Galvin | 343/5 PD X |
| 3,742,434 | 6/1973 | Leyde et al. | 49/25 X |
| 3,810,172 | 5/1974 | Burpee et al. | 343/5 PD |

Primary Examiner—T.H. Tubbesing
Attorney, Agent, or Firm—Boone, Schatzel, Hamrick & Knudsen

[57] ABSTRACT

An apparatus for automatically controlling the operation of a door comprises a microwave transceiver responsive to detect the movement of a randomly moving object and operative to develop a Doppler signal representative of such movement, the Doppler signal being generally sinusoidal with a zero crossing in each cycle, a strobe generator responsive to the Doppler signal and operative to develop a timing pulse upon the occurrence of each such zero crossing, a pair of integrating circuits responsive to the Doppler signal and operative to develop first and second signals of unlike polarity in the absence of the movement and of like polarity in the presence of the movement, a pair of OR gates for detecting the respective polarities of the first and second signals, a sample and hold circuit responsive to the timing pulse and operative to develop a control signal when the first and the second signals are of like polarity, and a relay driver responsive to the control signal and operative to open the door.

11 Claims, 8 Drawing Figures

Fig. 1

Fig_2  Fig_3

Fig_7

Fig_8

Fig_4

Fig_5

Fig. 6

APPARATUS FOR AUTOMATICALLY CONTROLLING DOOR OPERATION

BACKGROUND OF THE INVENTION

1. Field of the Invention

The present invention relates generally to an apparatus for automatically controlling the operation of a door, and more particularly to an apparatus which performs a time related analysis of Doppler signals developed in response to the movement of a moving object and is operative to open the door when such movement is detected.

2. Description of the Prior Art

Automatic doors of either the swinging or sliding type now form entrances to most office building, supermarkets, commercial establishments, and the like. Swinging doors are generally recognized as the industry standard, although sliding doors have achieved strong acceptance in the last decade because of their clean, functional appearance. To automatically open the doors, many door-actuating devices such as floor pressure mats, photo-electric systems and microwave motion sensing devices have been utilized.

Although floor pressure mats were commonly used in the past, architects are reluctant to install them in new buildings because of their unsightly appearance and high maintenance requirements. For example, in northern areas during the snowy season the mats have caused door malfunctions due to snow loading and have experienced deterioration when contacted with chemicals used to melt the snow. In addition, the mat is unable to detect a person standing on the threshold of the door, which could lead to injuries due to the inadvertent closing of the door.

Photo-electric systems which actuate a door when a person walks through a photo-electric beam directed in front of the door have been found to be expensive since several such systems are required to effectively cover the door area.

Heretofore, microwave motion sensing systems have employed a technique for analyzing the amplitude of a sensed microwave signal to actuate a sliding door. Such systems have included a pair of antennas positioned on either side of the door and having respective radiation patterns directed away from the door in a nonoverlapping manner to avoid sensing the sliding motion of the closing door. Since the radiation patterns do not overlap, a zone is formed over the threshold and on either side of the door in which motion cannot be detected. Hence, systems of this type present a potential safety hazard. In addition, the systems are unable to distinguish between man motion and door motion.

It should be noted that motion detection systems functioning on the Doppler principle are available. In one such system generally known as a Doppler-type system, frequency differences between generated and reflected electrical signals are monitored to detect the movement of objects within a monitored area. In practice, however, this system has been plagued by false alarms despite the introduction of filtering networks and the use of signal-isolation techniques. Furthermore, as filtering networks are added, the Doppler-type systems become extremely complex and, consequently, expensive to implement and maintain.

Examples of prior art motion detection systems include U.S. Pat. No. 3,634,884, entitled "Motion Detection System" by Vernon B. Ross; U.S. Pat. No. 3,665,443, entitled "Ultrasonic Intrusion Alarm," by Aaron A. Galvin; U.S. Pat. No. 3,742,434, entitled "Automatic Door-Opening System Using an Acoustic Object Detection System," by Warren L. Leyde and Delbert E. Marker; and U.S. Pat. No. 3,813,669, entitled "Frequency Filter Circuit Apparatus," by Leonard Thomas Saunders.

SUMMARY OF THE PRESENT INVENTION

It is therefore an object of the present invention to provide an automatic door-opening apparatus that is able to reliably discriminate between the motion of a person and the motion of a closing door, and in response thereto controls the operation of a door.

Another object of the present invention is to provide an apparatus which is capable of detecting minor, random movement, throughout an entire door opening and performing an accurate analysis of time-related Doppler signals developed therefrom and serves to control the operation of a door.

Briefly, the present invention includes a microwave transceiver responsive to detect the movement of a randomly moving object and operative to develop a Doppler signal representative of such movement, a strobe generator responsive to the Doppler signal and operative to develop a timing pulse on the occurrence of a zero crossing of each cycle of the Doppler signal, a pair of integrating circuits responsive to the Doppler signal and operative to develop first and second signals, respectively, of unlike polarity in the absence of the movement and of like polarity in the presence of the movement, a pair of OR gates for detecting the respective polarities of the first and second signals, a sample and hold circuit connected to the OR gates and being responsive to the timing pulse and operative to develop a control signal when the first and second signals are of like polarity, and a relay driver responsive to the control signal and operative to cause the door to be actuated. In addition, a bypass circuit is responsive to high frequency Doppler signals and is operative to supply a second control signal to the relay driver when the Doppler signal has a frequency greater than a preselected frequency. Preferably, two microwave transceivers are positioned relative to the door to provide overlapping radiation patterns to detect movement on both sides of the door opening as well as over the threshold.

An advantage of the present invention is that it is able to reliably discriminate between random motion associated with movements of a person and nonrandom motion associated with the closing of the door.

Another advantage of the present invention is that it is capable of detecting minor random movements throughout the entire door opening and in response thereto controls the operation of a door.

Still another advantage of the present invention is that it serves to perform a time-related analysis of Doppler signals developed in the presence of a moving object, independent of signal amplitude, and controls the operation of a door.

The foregoing and other objects and advantages of the invention will be apparent from the following detailed description of the preferred embodiments which makes reference to the several figures of the drawing.

DETAILED DESCRIPTION OF THE PREFERRED EMBODIMENT

Figure 1:
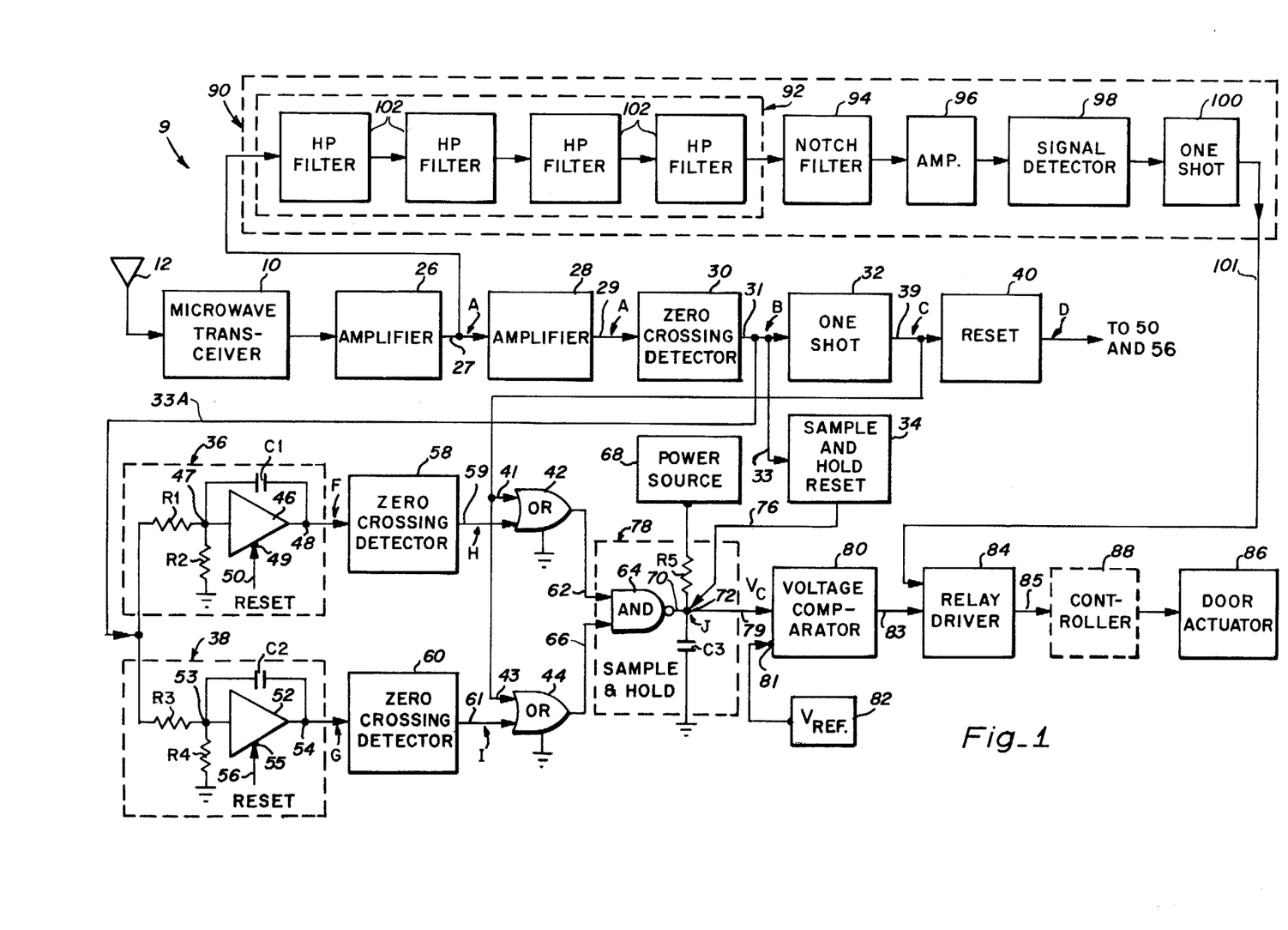
FIG. 1 is a block diagram generally illustrating an apparatus for automatically controlling the operation of a door in accordance with the present invention.

Referring now to FIG. 1, an apparatus, generally designated by the numeral 9, for automatically controlling the operation of a door is illustrated in block diagram form in accordance with the present invention. The apparatus 9 includes a transceiver 10 for continuously transmitting and receiving microwave signals. An antenna 12 is connected to the transceiver 10 and is driven thereby to radiate electromagnetic waves of sinusoidal waveform such that they saturate an area to be protected by the apparatus.

The electromagnetic waves radiating from the antenna 12 strike objects or targets within the radiation pattern of the antenna and are reflected back and received at the antenna 12. The reflected waves are converted by the transceiver 10 into alternating Doppler signals representative of objects moving within the antenna pattern. Preferably, the transceiver 10 transmits an X-band microwave signal having a center frequency of 10.525 gigahertz. The Doppler signals normally have a frequency in the range between 10 and 120 hertz.

A band pass amplifier 26 is connected to the transceiver 10. The amplifier 26 preferably has a gain of about 67 and corner frequencies of 1 and 150 hertz. A conductor 27 connects the amplifier 26 to a band pass amplifier 28 and carries the amplified Doppler signals produced within the transceiver 10. The waveforms appearing on the conductors interconnecting the blocks of the apparatus are illustrated in FIGS. 4–7 and will be discussed in detail below. The band pass amplifier 28 preferably has a gain of approximately 67 and corner frequencies of 1 and 15 hertz. Typically, the amplifiers 28 and 30 are operational amplifiers having capacitive elements (not shown) for effectively suppressing radio frequency interference. A conductor 29 connects the amplifier 28 to a zero crossing detector 30 and carries the amplified low frequency Doppler signals between 1 and 15 hertz. The zero crossing detector 30 serves to shape the Doppler signals into a square pulse having a uniform amplitude while preserving the time relationship of the zero crossings of the Doppler signals. The duty cycle of the square pulse is representative of the movement associated with the moving target.

A conductor 31 connects the zero crossing detector 30 to a one-shot circuit 32. The one-shot circuit 32, commonly referred to as a strobe generator, is responsive to each negative transition of the square pulse and is operative to provide a strobe pulse. The conductor 31 is connected by a conductor 33 to a sample-and-hold reset circuit 34 and by a conductor 33A to an integrator 36 and an integrator 38. A conductor 39 connects the one-shot circuit 32 to a reset circuit 40. A pair of conductors 41 and 43 connect the conductor 39 to a pair of OR gates 42 and 44, respectively.

The integrator 36 comprises an operational amplifier 46 having an input terminal 47, an output terminal 48, and a reset terminal 49. A resistor R1 is serially connected between the conductor 33A and the input terminal 47. A resistor R2 is connected between the input terminal 47 and ground. The resistors R1 and R2 form a voltage divider network. The resistance of resistor R1 is selected to be greater than that of the resistor R2 such that the integrator 36 is characterized as having an up-ramp slope which is greater than its down-ramp slope. An integrating capacitor C1 is connected between the input and output terminals 47 and 48, respectively. A conductor 50 is connected between the reset circuit 40 and the reset terminal 49 for providing a reset pulse to reset the operational amplifier 46.

Similarly, the integrator 38 comprises an operational amplifier 52 having an input terminal 53, an output terminal 54, and a reset terminal 55. A resistor R3 is connected between the conductor 33A and the input terminal 53 and a resistor R4 is connected between the input terminal 53 and ground, the resistors R3 and R4 forming a voltage divider network. An integrating capacitor C2 is connected between the input and output terminals 53 and 54, respectively. A conductor 56 is connected between the reset circuit 40 and the reset terminal 55 to provide a reset pulse to the operational amplifier 52. The resistance of resistor R3 is selected to be less than that of the resistor R4 such that the integrator 38 is characterized as having an up-ramp slope which is greater than its down-ramp slope.

A zero crossing detector 58, similar to the zero crossing detector 30, is connected to the output terminal 48. A conductor 59 connects the zero crossing detector to an input of the OR gate 42. Similarly, a zero crossing detector 60 is connected to the output terminal 54 and a conductor 61 connects the output of the zero crossing detector 60 to an input of the OR gate 44.

The OR gate 42 is connected by a conductor 62 to an input terminal of an AND gate 64 and the OR gate 44 is connected by a conductor 66 to another input terminal of the AND gate 64. A conductor 70 connects an output terminal of the AND gate 64 to one side of a resistor R5 and of a capacitor C3, so as to define a junction 72. A power source 68, which may be a direct current battery, is connected to the other side of the resistor R5. The other side of the capacitor C3 is connected to ground. The power source 68 serves to charge the capacitor C3 to an initial voltage. A conductor 76 connects the sample-and-hold reset circuit 34 to the junction 72 and serves to carry a reset signal for selectively restoring charge on the capacitor C3. The AND gate 64, the resistor R5 and the capacitor C3 comprise a sample-and-hold circuit, generally designated by the numeral 78. The time constant of the sample-and-hold circuit 78 which is defined by the product of R5 and C3 is selected to be much greater than the average opening and closing time required in a cycle of door actuation (approximately 2 seconds). In the preferred embodiment the time constant is approximately 27 seconds.

A conductor 79 connects the junction 72 to a voltage comparator 80 having a reference input terminal 81. A voltage reference source 82 is connected to the terminal 81 and serves to supply a reference voltage, $V_{ref}$, to the voltage comparator 80. A conductor 83 connects the voltage comparator to a relay driver 84 and carries a control signal to control the operation of the relay driver. Although not shown, the relay driver 84 comprises a Darlington driver transistor in combination with a normally de-energized relay such that application of the control signal to the relay driver energizes the relay. A conductor 85 connects the relay driver 84 to a door actuator 86 which is operative to provide an actuation signal for opening a sliding door 87 when the relay is energized.

A bypass circuit 90 is connected between the amplifier 26 and the relay driver 84. The bypass circuit 90 includes a cascade filter 92, a notch filter 94, an amplifier 96, a signal detector 98, and a one-shot circuit 100 connected in a series configuration. A conductor 101 connects the one-shot circuit 100 to the relay driver 84. The cascade filter 92 comprises four high pass filters 102, each of which is characterized by a gain of unity in its pass band, a roll-off of 12 decibels per octave, and a low corner frequency of approximately 37 hertz. The notch filter is tuned to a frequency of 120 hertz and serves to remove interfering signals which may be generated by fluorescent lights (not shown). The amplifier 96 has a gain of substantially 60 and a pass band of 37 to 150 hertz. The signal detector 98 is responsive to signals at the output of the amplifier 96 within the frequency range of 37 to 150 hertz and is operative to trigger the one-shot circuit 100. The one-shot circuit 100 produces on the conductor 101 a single pulse having a duration of substantially 2 seconds which serves to actuate the relay in response to fast moving targets as will be subsequently described.

In an alternative embodiment, a controller 88, shown in dashed lines, is connected between the relay driver 84 and the door actuator 86, and includes logic circuitry to control door actuation when the doors 87 are of the swinging type. The controller 88 serves to prevent the swinging doors 87 from being actuated when a person moves toward the door from the side toward which the door swings.

Figure 2:
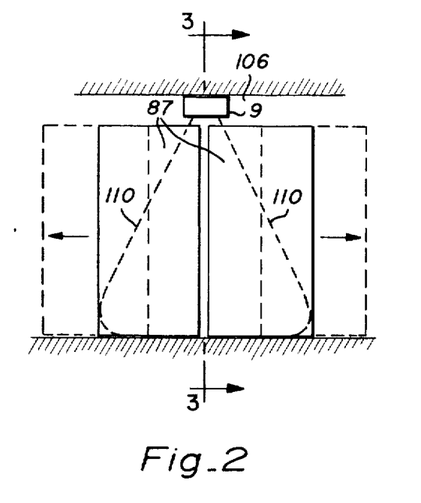
FIG. 2 is a front elevational view, schematically illustrating the apparatus of FIG. 1 mounted above a sliding door with the radiation patterns in the plane of the door shown in dashed lines.
Figure 3:
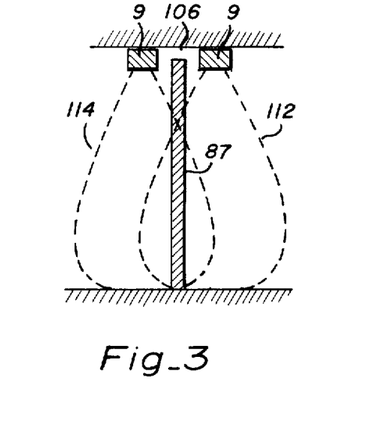
FIG. 3 is a side elevational cross-sectional view taken through the lines 3—3 of FIG. 2 with the radiation patterns shown in dashed lines.

With reference to FIGS. 2 and 3, the apparatus 9 is mounted to the sides of the top portion of a frame 106 which serves to hold the sliding doors 87. The doors 87 are movable between a closed position and an open position, shown in dashed lines in FIG. 2. Preferably, the antennas 12 of each apparatus are disposed on a centerline through the sliding doors 87 where the doors 87 meet one another. The radiation pattern of the antennas 12 is illustrated by the dashed lines and designated by the numerals 110, 112 and 114. As shown, the numeral 110 represents the pattern formed in the plane of the door and is substantially triangular in shape, having outer extremities that encompass the sides of the doors 87 when the doors are in the closed position. The numerals 112 and 114 represent the patterns formed by the respective apparatus 9 in planes perpendicular to the plane of the door. Preferably, each pattern extends about 5 feet in front of the door and about one foot behind the door such that the patterns 112 and 114 overlap over the threshold of the door. Thus, no dead zone occurs in the proximity of the doors 87 so as to allow the sensing of moving objects throughout the entire opening of the doors.

Figure 4:
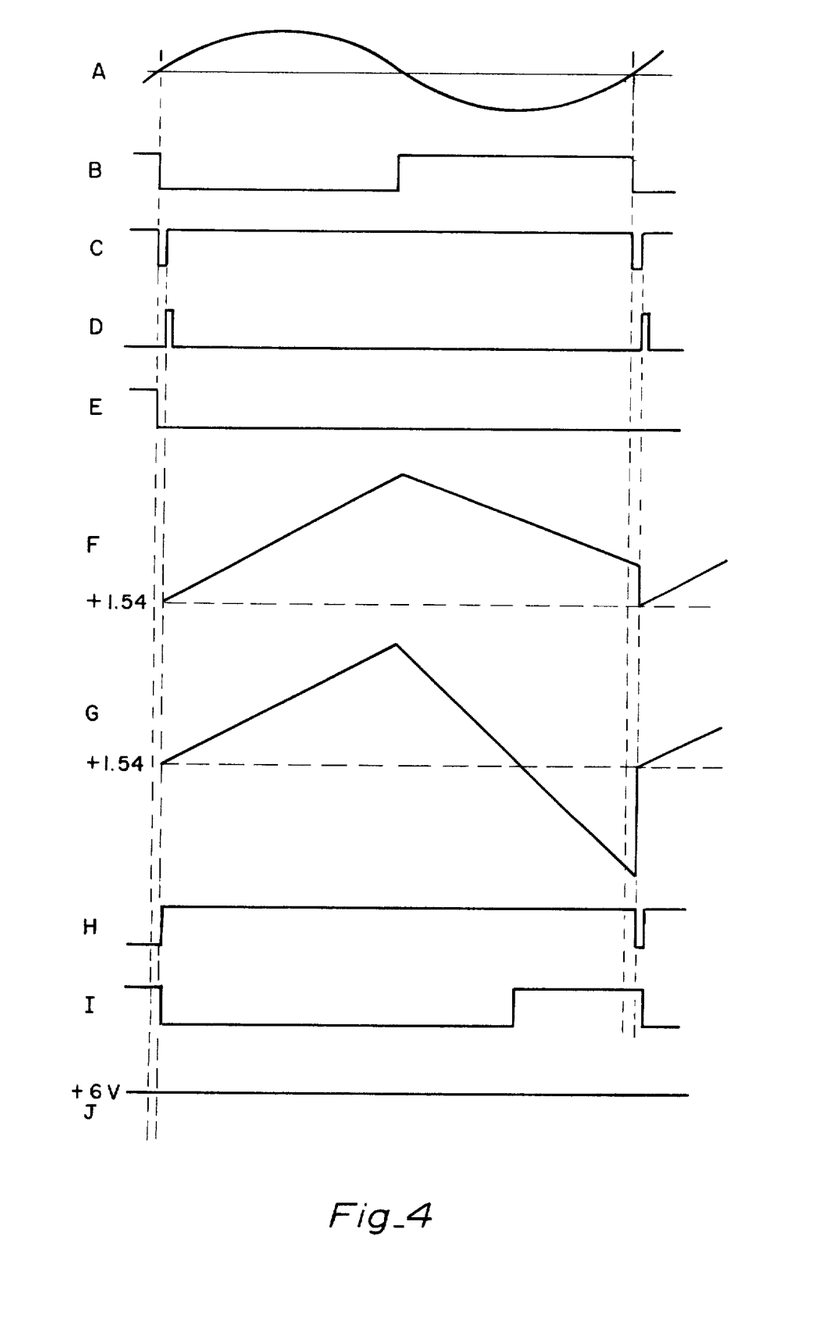
FIG. 4 is a timing diagram used to schematically illustrate operation of the apparatus shown in FIG. 1 when nonrandom motion is detected.
Figure 5:
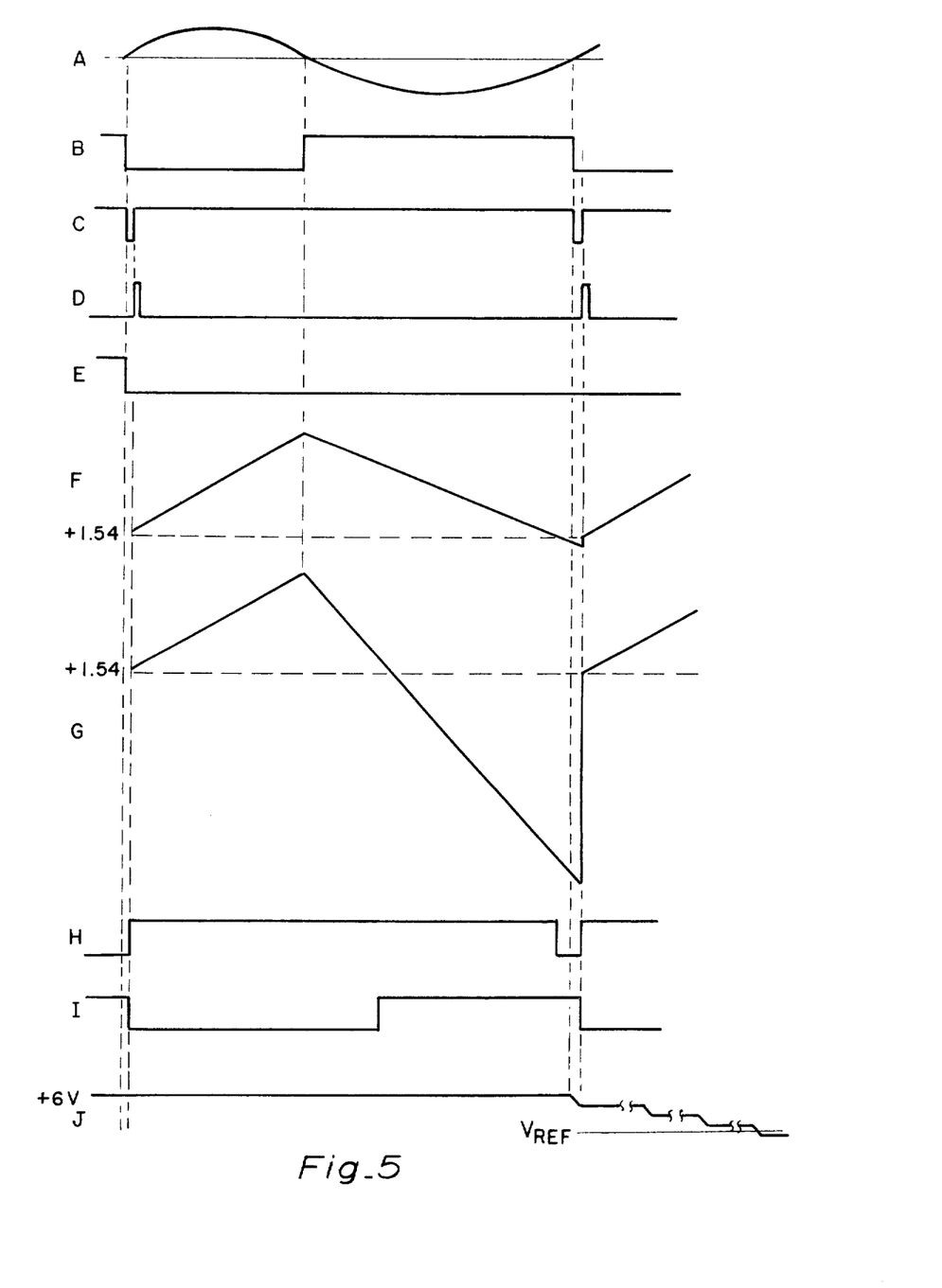
FIGS. 5 and 6 are timing diagrams used to schematically illustrate operation of the apparatus when random motion is detected.
Figure 6:
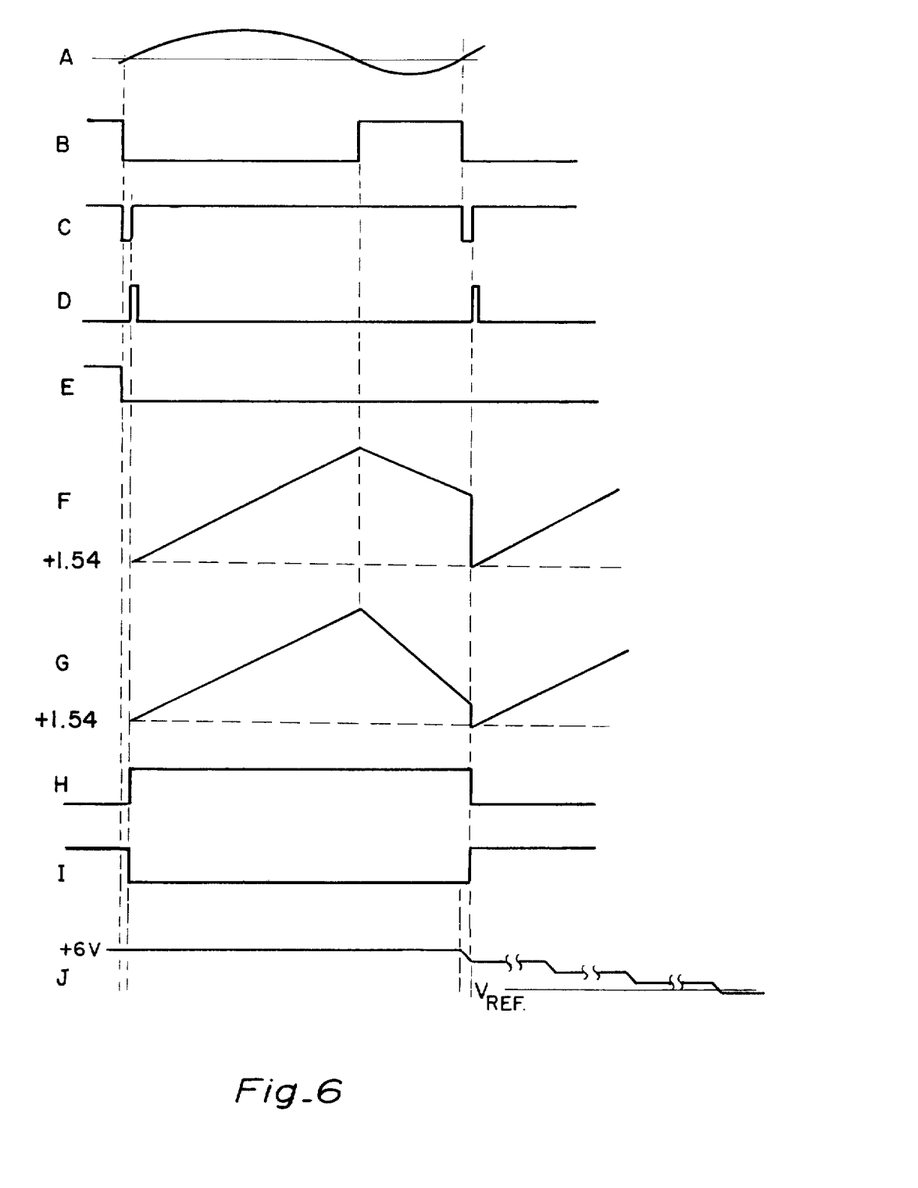

Operation of the apparatus 9 is best understood with reference to FIGS. 4, 5 and 6 which illustrate waveforms at various points within the apparatus. FIG. 4 illustrates waveforms when nonrandom movement is present within the radiation pattern of the antenna 12. The nonrandom movement may be representative, for example, of the sliding motion caused by the opening or closing of the doors 87. FIGS. 5 and 6 illustrate waveforms when random movement is present. Random motion has been found to represent, for example, the movement of a person or an object. As shown, a waveform A represents the alternating Doppler signal present on the conductors 27 and 29 after amplification by the amplifiers 26 and 28. When nonrandom motion is present as shown in FIG. 4A, the Doppler signal has a substantially 50—50 duty cycle. When random motion is present, as shown in FIGS. 5A and 6A, the waveform A has a duty cycle other than 50—50. For example, the waveform of FIG. 5A represents a duty cycle of about 30–70, whereas the waveform of FIG. 6A represents a duty cycle of about 70–30. The zero crossing detector 30 serves to transform the Doppler signal into an inverted squared signal as illustrated by the waveform B in which the time relationship of the zero crossings of the Doppler signal are preserved. The squared signal is conducted by conductors 31, 33 and 33A to the one-shot circuit 32, the sample-and-hold reset circuit 34 and the integrators 36 and 38, respectively.

The one-shot circuit 32 generates a strobe pulse represented by waveform C in response to every negative transition of the squared signal. Typically, the strobe pulse has a low state when present and a duration of about 4 milliseconds. The strobe pulse is applied on the conductors 41 and 43 directly to the OR gates 42 and 44, respectively, and also on the conductor 39 to the reset circuit 40. The reset circuit 40 is responsive to the positive transition of the strobe pulse and is operative to develop a reset pulse, represented by the waveform D, for application to the reset terminals 49 and 55, respectively. The reset pulses initialize the capacitors C1 and C2 to a zero charge condition and provide initial voltages of about 1.54 volts at the output terminals 48 and 54.

Since the squared signal and the reset pulses are applied substantially simultaneously to the integrators 36 and 38, the integrators begin ramping upwardly, to provide integrated signals as illustrated by the waveforms F and G, during the down state of the waveform B. As previously discussed, the slope of the upward ramps are determined by the resistances of the resistors R1 and R3. When the squared signal transitions to the up state, the integrators 36 and 38 commence to ramp downwardly with slopes dependent upon the resistance of the resistors R2 and R4, respectively. Since the resistance of the resistor R2 is less than that of the resistor R4, the value of the integrated signals will continuously vary from one another. The zero crossing detectors 58 and 60 are responsive to the polarity of the integrated signals represented by the waveforms F and G (relative to the 1.54 volt initial reference) and are operative to square the integrated signals while preserving crossings of the 1.54 volt reference level, thus providing the squared signals represented by the waveforms H and I. The zero crossing detector 60 also serves to invert the integrated signal of waveform G. Consequently, a transition of the square signal is provided for every crossing of the waveforms F and G below the 1.54 volt level.

As illustrated in FIG. 4, because of the symmetry of the duty cycle, the waveform 4F remains positive throughout the cycle, thereby maintaining the waveform 4H at a positive polarity or high level for the duration of the cycle. In contrast, the waveform I transitions to a negative polarity or low level, at the beginning of the cycle and transitions to a positive polarity or high level, when the integrated signal represented by the waveform G drops below its initial value. The application of the squared signal represented by the waveform H and the strobe pulse to the OR gate 42 renders the OR gate 42 conductive whenever the waveform H is high while the strobe pulse is present. Similarly, the signal represented by the waveform I and the strobe pulse are applied to the OR gate 44 such that the OR gate is rendered conductive if the waveform I is high while the strobe pulse is present.

Referring now to FIG. 4, it is noted that waveforms H and I are both high for the duration of the strobe pulse. Consequently, signals are conducted on the conductors 62 and 66 so as to activate the AND gate 64. The activation of the AND gate 64 in the forward direction prevents the capacitor C3 from discharging and thus maintains the initial voltage across the capacitor C3. The voltage across the capacitor C3, which appears on the conductor 79, is designated as $V_c$ and represented by the waveform J. Since $V_c$ is maintained constant at a voltage greater than the reference voltage $V_{ref}$, present on the conductor 81, the voltage comparator 80 is inoperative to activate the relay driver 84, and the doors 87 remain closed.

As illustrated in FIGS. 5 and 6 when randon motion is present, either the squared signal represented by waveform H is low (FIG. 5) or that represented by waveform I is low (FIG. 6). Consequently, a path is provided from the junction 72 through the AND gate 64 and the OR gates 42 and 44 to ground to discharge a portion of the voltage, $V_c$, from the capacitor C3. The discharge lasts until the AND gate 64 is again rendered conductive by the strobe pulse (waveform C) going high.

In the preferred embodiment the initial voltage on the capacitor C3 is about 6 volts, the discharge voltage is about 0.4 volts per cycle, and the reference voltage, $V_{ref}$, is about 4.6 volts. Thus, at least four discharge cycles are required before $V_c$ drops below $V_{ref}$ and the comparator 80 conducts a control signal on the conductor 83 to the relay driver 84. The control signal energizes the relay which transmits a signal on the conductor 85 to the door actuator 86, which in turn causes the doors 87 to open. Four discharges have been selected as the criteria for door actuation to prevent inadvertent false alarms from triggering the relay driver 84.

If, however, one, two or three cycles of movement are detected and motion thereafter stops, the sample-and-hold reset circuit 34 serves to reset the capacitor C3. In particular, the sample-and-hold reset circuit 34 is operative to charge the capacitor C3 to its initial voltage by providing a reset pulse, illustrated by the waveform E, to the junction 72 whenever a preselected time interval occurs between squared signals on the conductor 31.

Figure 7:
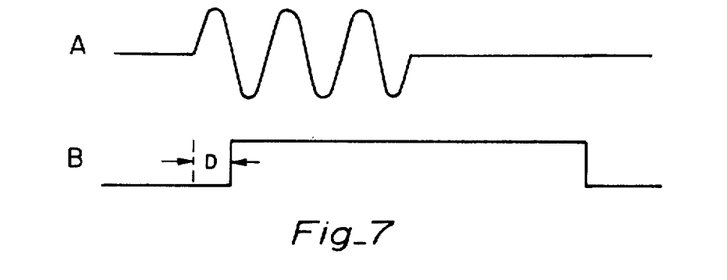
FIG. 7 is a timing diagram used to schematically illustrate operation of the apparatus when high speed motion is detected.

With reference to FIG. 7, it should be recognized that in the presence of high speed moving objects which generate Doppler signals having a frequency of greater than 37 hertz, as represented by the waveform of FIG. 7A, the time required to actuate the door may be greater than the time required for the target to reach the sliding door 18. In these situations, the bypass circuit 90 becomes operative. The bypass circuit 90 is responsive to sense Doppler signals having a frequency between 37 and 150 hertz and is operative to provide a bypass pulse shown in FIG. 7B directly to the relay driver 84 to energize the relay. Within the bypass circuit 90, the high frequency Doppler signal is conducted through the four stage cascade filter 92 and amplified by the amplifier 96. The notch filter 94 prevents interfering signals due to proximate fluorescent lights from actuating the relay driver 84. The occurrence of the amplified signal is detected by the signal detector 98 which causes the one-shot circuit 100 to generate the bypass pulse on the conductor 101. Because of the phase delay associated with the filters 102 and 104, the bypass pulse is delayed by the time D, as shown in FIG. 7B. The bypass pulse remains up for approximately 2 seconds after the last high frequency Doppler signal terminates. Actuation of the relay driver 84 for that period of time easily allows a person moving at that speed to pass through the door 87.

Figure 8:
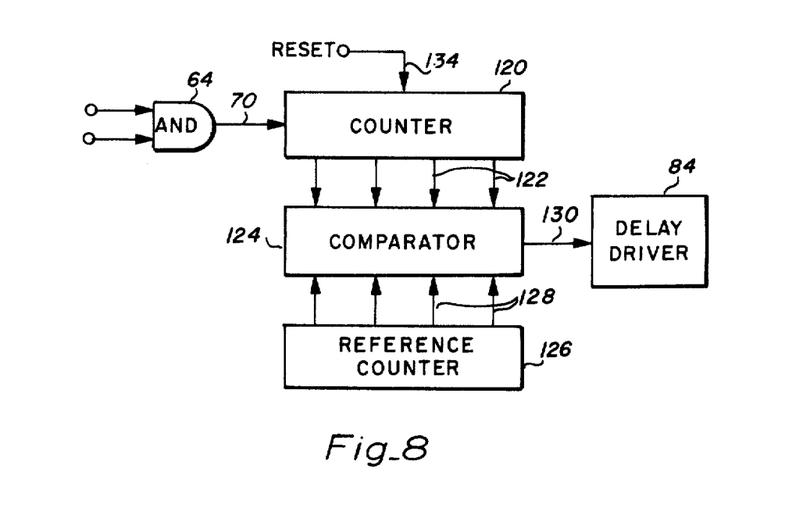
FIG. 8 illustrates in block diagram form an alternative embodiment of a portion of the apparatus shown in FIG. 1.

An alternative embodiment of the present invention in which a digital signal processor is connected between the AND gate 64 and the relay driver 84 is illustrated in block diagram form in FIG. 8. As shown, the AND gate 64 is connected by the conductor 70 to a counter 120 having a multiplicity of binary stages. The output of each binary stage is connected by a respective conductor 122 to a corresponding stage of a comparator 124. A reference counter 126, having the same number of binary stages as the comparator 124 and the counter 120 is connected to the stages of the comparator 124 and with a multiplicity of conductors 128 to supply a preselected binary reference signal to the comparator.

In operation the pulses conducted through the AND gate 64 are counted and stored in the counter 120. When the count in the counter 120 becomes equal to the preselected reference signal supplied to the comparator 124 by the reference counter 126, a control pulse is supplied on the conductor 130 to the relay driver 84. A conductor 134 is also connected to the counter 120 to reset the counter after a predetermined length of time after the last Doppler signal is received has elapsed, as in the previous embodiment.

From the above, it will be seen that there has been provided an apparatus for automatically controlling the operation of a door which fulfills all of the objects and advantages set forth above.

While the invention has been particularly shown and described with reference to certain preferred embodiments, it will be understood by those skilled in the art that various alterations and modifications in form and detail may be made therein without departing from the invention. Accordingly, it is intended that the following claims cover all such alterations and modifications as fall within the true spirit and scope of the invention.

What is claimed is:

1. An apparatus for automatically controlling the operation of a door comprising:
 first means responsive to detect the movement of a randomly moving object and operative to develop a Doppler signal representative of such movement, said Doppler signal being generally sinusoidal with a zero crossing in each cycle;

second means responsive to said Doppler signal and operative to develop a timing pulse upon the occurrence of each said zero crossing;

third means responsive to said Doppler signal and operative to develop first and second signals of unlike polarity relative to a predetermined reference level in the absence of said movement and of like polarity relative to said reference level in the presence of said movement;

fourth means for detecting the respective polarities of said first and second signals, said fourth means being responsive to said timing pulse and operative to develop a control signal when said first and said second signals are of like polarity; and fifth means responsive to said control signal and operative to open the door.

2. An apparatus for automatically controlling the operation of a door as recited in claim 1 wherein said third means includes sixth means for integrating said Doppler signal so as to provide a first integrated signal, seventh means coupled to said sixth means responsive to a zero crossing of said first integrated signal and operative to develop said first signal, eighth means for integrating siad Doppler signal so as to provide a second integrated signal, and ninth means coupled to said eighth means responsive to a zero crossing of said second integrated signal and operative to develop said second signal.

3. An apparatus for automatically controlling the operation of a door as recited in claim 2 including means responsive to said timing pulse and operative to develop a reset signal, and means for applying said reset signal to said sixth means and said eighth means so as to reset said first and second signals to said predetermined reference level.

4. An apparatus for automatically controlling the operation of a door as recited in claim 1 wherein said fourth means includes a first OR gate means for gating said timing pulse and said first signal, a second OR gate means for gating said timing pulse and said second signal, and AND gate coupled to said first and second OR gates, and tenth means coupled to said AND gate for developing a control voltage which varies in accordance with the polarities of said first and second signals.

5. An apparatus for automatically controlling the operation of a door as recited in claim 4 and further comprising comparator means responsive to said control voltage and operative to develop said control signal when said control voltage falls below a preselected reference.

6. An apparatus for automatically controlling the operation of a door as recited in claim 4 wherein said tenth means includes a capacitor having an initial voltage thereacross, said capacitor discharging through said AND gate when said first and second signals are of like polarity and further comprising means for restoring said initial voltage across said capacitor.

7. An apparatus for automatically controlling the operation of a door as recited in claim 1 wherein said fifth means includes a relay driver responsive to said control signal and door actuating means connected to said relay driver for actuating the door.

8. An apparatus for automatically controlling the operation of a door as recited in claim 1 wherein said fifth means is additionally responsive to said second control signal, and further including bypass means responsive to said Doppler signal and operative to develop a second control signal when said Doppler signal has a frequency greater than a preselected frequency and means for applying said second control signal to said fifth means.

9. An apparatus for automatically controlling the operation of a door as recited in claim 1 wherein said first means comprises a first microwave transceiver.

10. An apparatus for automatically controlling the operation of a door as recited in claim 9 and further including a second microwave transceiver, said first and second transceivers being mounted above a sliding door and being characterized by radiation patterns which extend in front of and behind the plane of the door such that a continuous detection zone is formed near the door.

11. An apparatus for automatically controlling the operation of a door as recited in claim 1 wherein said first means includes means for preserving the time relationship of the zero crossings of said Doppler signal.

* * * * *